April 1, 1947.   P. J. HUEBSHMAN   2,418,178
SPARE TIRE CARRIER SKID ASSEMBLY
Filed Feb. 26, 1945   2 Sheets-Sheet 1
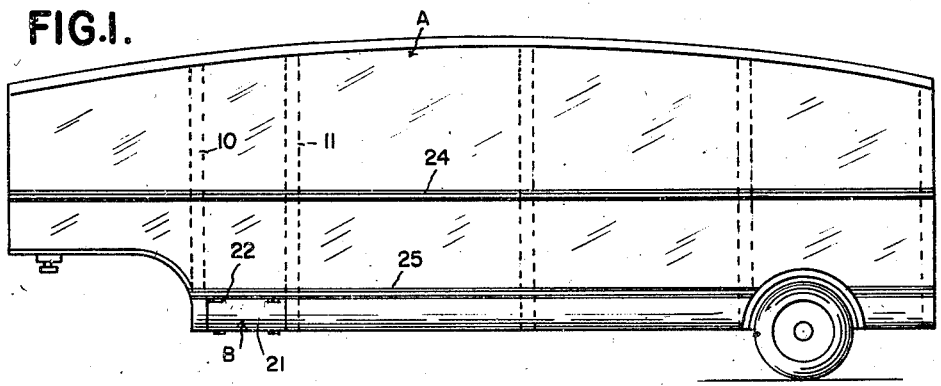
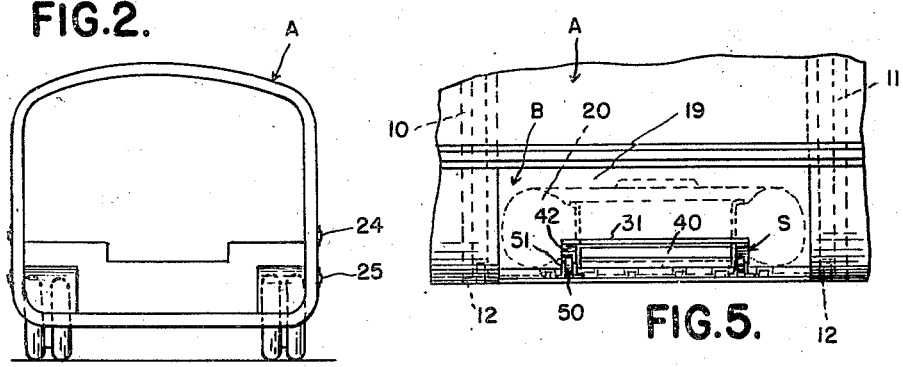
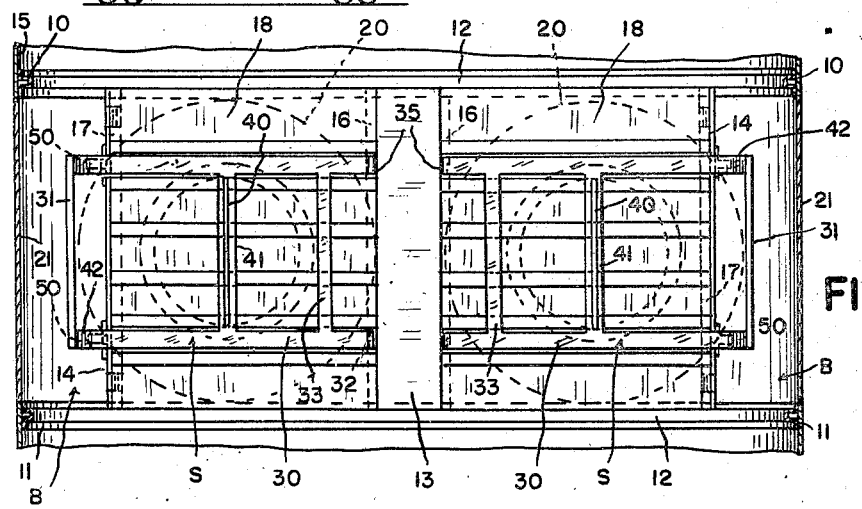
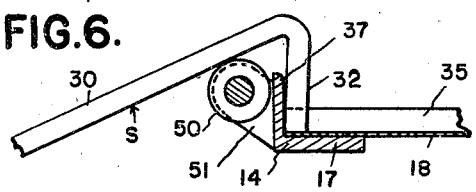
*INVENTOR.*
PAUL J. HUEBSHMAN
*BY*
ATTORNEYS

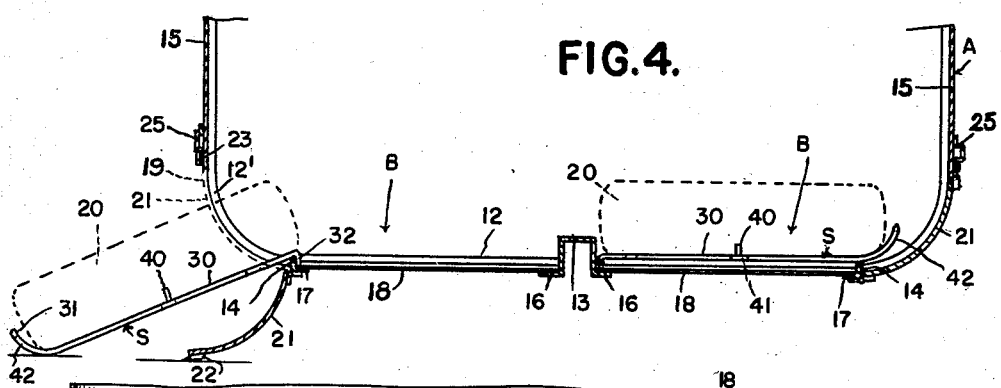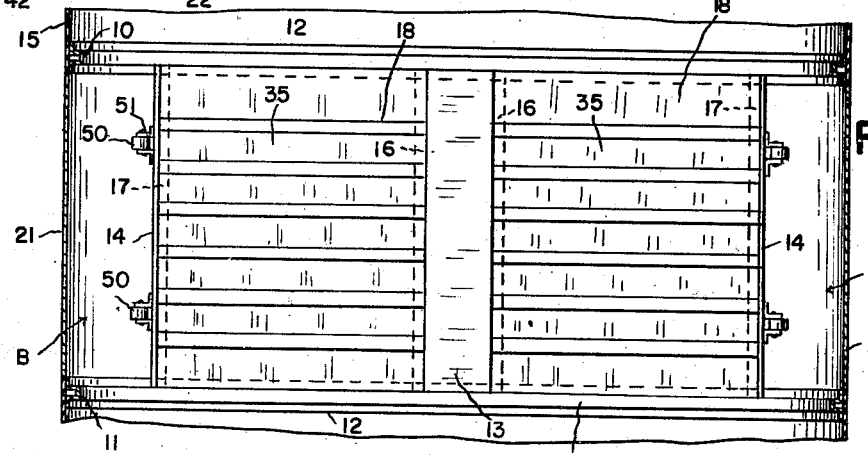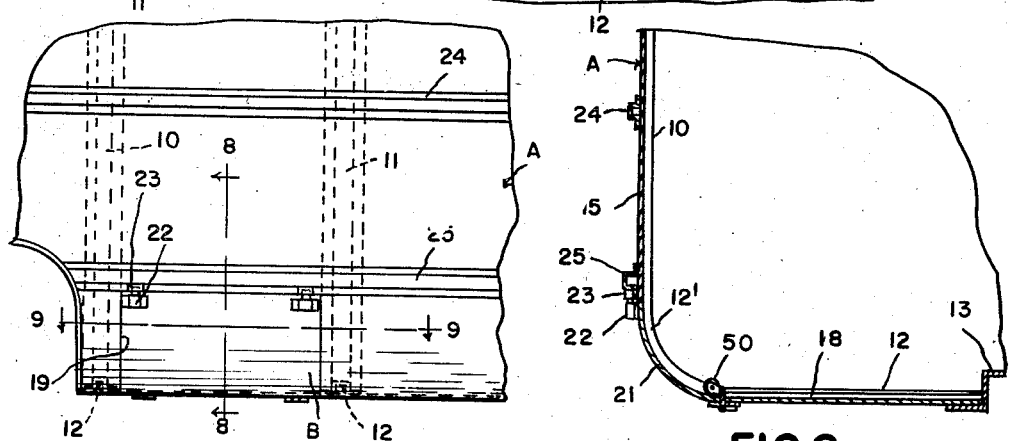

Patented Apr. 1, 1947

2,418,178

UNITED STATES PATENT OFFICE 2,418,178

SPARE TIRE CARRIER SKID ASSEMBLY

Paul J. Huebshman, Dearborn, Mich., assignor to Whitehead & Kales Company, River Rouge, Mich., a corporation of Michigan Application February 26, 1945, Serial No. 579,863

16 Claims. (Cl. 224—29)

This invention relates generally to spare tire carriers and refers more particularly to a spare tire carrier skid assembly.

One of the essential objects of the invention is to provide an assembly of this type adapted for use with heavy duty vehicles such as semi-trailers and the like having relatively heavy tire and/or rim assemblies.

Another object is to prevent the difficulties formerly experienced when lifting very heavy tires or tire and rim assemblies into spare tire compartments of such vehicles.

Another object is to provide an assembly which enables a spare tire or tire and rim assembly to be placed onto the skid and enables the loaded skid to be readily slid into the spare tire compartment.

Another object is to provide an assembly which normally is within the spare tire compartment behind a door or other suitable closure therefor, and may be utilized as aforesaid to load or unload a spare tire or tire and rim assembly without damaging or injuring the door and associated parts of the compartment.

Another object is to provide an assembly wherein the skid thereof has a frame provided on a reinforcing cross bar thereof with an upstanding web or rib constituting a pilot or centering device for the spare tire or rim therefor.

Another object is to provide an assembly wherein a corrugated floor sheet is employed as a platform at the bottom of the spare tire compartment to carry the skid and spare tire within said compartment and to provide between the corrugations suitable slideways for hook-shaped end portions of the skid when the latter is moved to and from the compartment.

Another object is to provide an assembly wherein an abutment, preferably in the form of an angle iron, is provided at the outer end of the compartment for the hook-shaped end portions of the skid to limit outward sliding movement of the skid relative to the compartment to prevent accidental disengagement of the skid from the compartment when the skid is in a downwardly inclined position on the ground for loading or unloading purposes.

Another object is to provide an assembly wherein the corrugated floor sheet rests upon and is secured to a portion of said abutment and a longitudinally extending frame member of the vehicle.

Another object is to provide an assembly wherein cross bars of the vehicle carry the abutment and longitudinally extending frame member.

Another object is to provide an assembly wherein the longitudinally extending member is adapted to serve as a common support for two corrugated floor sheets and as an abutment for two spare tires, i. e., one at each side of the vehicle when similar spare tire compartments are provided at opposite sides of the vehicle.

Another object is to provide an assembly that is simple in construction, economical to manufacture, and efficient in operation.

Other objects, advantages and novel details of construction of this invention will be made more apparent as this description proceeds, especially when considered in connection with the accompanying drawings, wherein:

Fig. 1 is a side elevation of a vehicle equipped with a spare tire compartment and skid assembly embodying my invention;

Fig. 2 is a rear end view of the vehicle shown in Fig. 1;

Fig. 3 is a plan view of the spare tire carrier skid assembly and showing a skid in loaded position within each compartment;

Fig. 4 is a fragmentary vertical transverse sectional view through the spare tire compartments of the vehicle, showing the loading position of one skid with tire thereon, and showing the loaded position of the other skid with tire thereon;

Fig. 5 is a fragmentary elevational view of the assembly when the skid and tire thereon are in loaded position within the compartment, the door for said compartment being omitted;

Fig. 6 is an enlarged fragmentary vertical sectional view through the angle bar and associated parts of one of the spare tire compartments and showing the hook-shaped end portions of one of the skids in engagement with said angle bar, when the parts are in the loading position;

Fig. 7 is a fragmentary elevational view of the vehicle, showing the closure for one of the spare tire compartments in closed position;

Fig. 8 is a sectional view taken substantially on the line 8—8 of Fig. 7;

Fig. 9 is a sectional view taken substantially on the line 9—9 of Fig. 7.

Referring now to the drawings, A is a semi-trailer having similar spare tire compartments B in opposite sides thereof. Preferably these compartments are adjacent the forward end of the vehicle and are located between spaced uprights 10 and 11, respectively, of the vehicle frame. However, such compartments may be in other types of vehicles and in other parts thereof, or only one such compartment may be provided, as desired.

In the present instance, the semi-trailer A is provided at longitudinally spaced points thereof with transversely extending laterally flanged inverted channel-shaped frame members or cross bars 12 which have upturned end portions 12' connected to the uprights 10 and 11 at opposite sides of the vehicle and carry a longitudinally extending laterally flanged inverted channel-shaped frame member 13 and outer longitudinally extending angle bars 14. Preferably the longitudinally extending member 13 is at the center or longitudinal median line of the vehicle, while the angle bars 14 are spaced laterally inward from opposite side walls 15 of the vehicle.

Resting upon and secured to the lateral flanges or legs 16 and 17, respectively, of the longitudinally extending frame member 13 and the outer angle bars 14 are corrugated metal sheets 18 that form the flooring of the compartments B and preferably have their corrugations extending transversely of the vehicle so as to be in line with suitable openings 19 in the side walls 15 of the vehicle. Such openings 19 are of sufficient size to permit movement therethrough of the spare tires 20 or tire and rim assemblies into and out of the compartments B and normally are closed by doors 21 hinged at their lower ends to the angle bars 14 and provided at their upper ends with accessible latch means 22 for engagement with suitable keepers or fasteners 23 on the side walls 15 of the vehicle.

The side walls 15 of the vehicle may be any suitable construction such as sheet metal and are preferably provided at vertically spaced points thereof with longitudinally extending channel-shaped rub rails 24 and 25, respectively, the lower rails 25 being just above and serving as protectors for the doors 21 when the latter are in closed position.

A skid S for carrying a spare tire or tire and rim assembly is employed in each compartment B and preferably has a substantially H-shaped substantially flat frame 30 provided at its forward end with a handle bar 31 by which the skid may be manipulated and provided at its rear end with downturned hooks 32. If desired, the frame 30 may also be provided adjacent its rear end with a cross bar 33 for reinforcing purposes.

In use, the hooks 32 of the skids are adapted to slide in grooves 35 of the corrugations of the floor sheets 18 during such manipulation and to engage the upstanding flanges 37 of the outer angle bars 14 to limit outward sliding movement of the skids and thereby prevent accidental disengagement of the skids from the compartments when the skids are in a downwardly inclined position on the ground, as illustrated in Fig. 4, for loading and unloading purposes.

For retaining a spare tire or tire and rim assembly on the skid, an upstanding centering web or pilot 40 is provided on the cross bar 41 at the center of the skid for engagement with the center of the tire 20 or rim therefor, and the forward end portion 42 of the frame 30 is preferably upturned for engagement with the periphery of said tire. Thus, separate fasteners or retainers for the tire or tire and rim assembly are unnecessary.

When it is desired to load a spare tire 20 into a compartment B, the door 21 of the compartment is first lowered onto the ground as illustrated in Fig. 4. Then the skid S is pulled out of the compartment B so that the curved end portion 42 may rest upon the ground in spaced relation to the door. After a spare tire such as 20 is centered upon the skid, the latter is then slid back into the compartment so that the door 21 may again be closed. Preferably rollers 50 carried by brackets 51 rigid with the outer angle bars 14 are engageable with the underside of the skid frame 30 during movement thereof into and out of the compartment to make it easier for the operator to manipulate the skid as described. When the skid is in loaded position within the compartment, as illustrated in Fig. 3, the tire 20 abuts against the longitudinal frame member 13. Thus, when spare tires are loaded in both compartments at opposite sides of the vehicle the longitudinally extending frame member 13 is adapted to serve as a common abutment for such tires in addition to serving as a common support for the floor sheets 18 in both compartments.

Preferably the frame 30 of the skid is made of flat bar stock, and the the web or rib 40 constituting the pilot for the tire or rim therefor is welded onto the center reinforcing cross bar 41 of the frame. However, it is apparent that the frame 30 of the skid may be made of any suitable material and the pilot 40 may be anchored in any suitable manner upon said frame, as desired.

What I claim as my invention is:

1. In combination, a vehicle body having a longitudinally extending central frame member having laterally extending legs substantially at floor level and a vertically extending portion between said legs extending substantially above floor level, longitudinally extending side frame members, floor sheets supported between said side frame members and the laterally extending legs of said central frame member, door openings at opposite sides of said vehicle, tire carrying skids movable through said door openings, the vertically extending portion of said central frame member serving as a common intermediate abutment or stop for tires mounted on said skids.

2. In combination, a vehicle having an upright wall, a spare tire compartment opening outwardly through said upright wall, a tire carrying skid movable through said opening to and from said compartment, and a supporting floor sheet for said skid within said compartment, said sheet being corrugated with the corrugations extending toward said opening, and said skid having portions slidable in grooves of said corrugations to guide the skid during movement thereof through said opening.

3. In combination, a vehicle having an upright wall, a spare tire compartment opening outwardly through said upright wall, a tire carrying skid movable through said opening to and from said compartment, an abutment adjacent said opening, and a support for said skid within said compartment, said support having a slideway extending toward said opening, and said skid having a hook slidable in said slideway to guide the skid during movement thereof through the opening and engageable with said abutment to limit such movement in one direction.

4. In combination, a vehicle having a spare tire compartment, a closure therefor, a floor element in said compartment, a tire carrying skid slidable on said floor element into and out of said compartment when said closure is in an open position, a roller at the outer end of said compartment for supporting said skid during movement thereof, said skid having a portion adapted to rest on the ground when the skid is moved out of said compartment, an abutment at the outer end of said compartment, and means cooperating with said floor element for guiding the skid during movement thereof, including means engageable with said abutment to limit outward movement of the skid relative to said compartment.

5. In combination, a vehicle having a spare tire compartment, a floor element in said compartment, a tire carrying skid slidable on said floor element into and out of said compartment, said skid having a portion adapted to rest on the ground when the skid is moved out of said compartment, an abutment at the outer end of said compartment, and means cooperating with said floor element for guiding the skid during movement thereof, including means engageable with said abutment to limit outward movement of the skid relative to said compartment.

6. A spare tire carrier skid assembly comprising a tire carrying skid, and a support therefor, said skid having means for positioning a spare tire thereon and being slidable over said support, said positioning means including a rigid upstanding centering web for the tire and a curved end portion engageable with the periphery of the tire.

7. A spare tire carrier skid assembly comprising a substantially horizontal platform, and a tire carrying skid slidable over said platform onto the ground, the platform having an abutment at one end and having a slideway extending toward said abutment, and said skid having a hook slidable in said slideway and engageable with said abutment.

8. A spare tire carrier skid assembly comprising a platform, a tire carrying skid slidable on said platform, said skid having spaced rails, and a cross bar between said rails having a rigid upstanding web forming a centering pilot for the tire on said skid.

9. A spare tire carrier skid assembly comprising a corrugated platform, an abutment at one end of the corrugations of said platform, and a tire carrying skid having means slidably engaging the corrugations of said platform and engageable with said abutment to limit sliding movement of said skid in one direction relative to said platform.

10. A spare tire carrier skid assembly comprising laterally spaced floor elements, a frame member between said floor elements forming a common support therefor and constituting a common abutment for tires above said floor elements, frame members at the remote edges of said floor elements for supporting the same, and supporting skids for said tires slidable on said floor elements toward and away from the first mentioned frame member and having means engageable with portions of said last mentioned frame members to limit movement of the skids away from said first mentioned frame member.

11. A spare tire carrier skid assembly comprising laterally spaced floor elements, a frame member between said floor elements forming a common support therefor and constituting a common abutment for tires above said floor elements, frame members at the remote edges of said floor elements for supporting the same, and supporting skids for said tires slidable on said floor elements toward and away from the first mentioned frame member and having means engageable with portions of said last mentioned frame members to limit movement of the skids away from said first mentioned frame member, said skids and floor members having cooperating portions for guiding the skids during sliding movement thereof.

12. A spare tire carrier skid assembly comprising laterally spaced floor elements, a frame member between said floor elements forming a common support therefor and constituting a common abutment for tires above said floor elements, frame members at the remote edges of said floor elements for supporting the same, supporting skids for said tires slidable on said floor elements toward and away from the first mentioned frame member and having means engageable with portions of said last mentioned frame members to limit movement of the skids away from said first mentioned frame member, and rollers carried by the last mentioned frame members and engageable with the undersides of said skids to facilitate sliding movement thereof on said floor elements.

13. A spare tire carrier skid assembly comprising laterally spaced frame members having opposed lateral flanges, a third frame member between and substantially parallel to the spaced frame members and provided at opposite sides thereof with lateral flanges, floor members at opposite sides of said third frame member and supported by the lateral flanges thereof and of said spaced members, and skids shaped to carry tires slidable over said floor members toward and away from said third frame member, said floor members and skids having cooperating guide elements for said skids, and said spaced frame members and skids having portions adapted to cooperate with each other to limit sliding movement of said skids when guided by said cooperating elements.

14. In combination, a vehicle having an upright wall, a spare tire compartment opening outwardly through said upright wall, a tire carrying skid movable through said opening to and from said compartment, an abutment adjacent said opening, a support for said skid within said compartment, said support having a slideway extending toward said opening, said skid having a portion adapted to rest upon the ground when the skid is moved out of said compartment, antifriction means at the outer end of said compartment for supporting said skid during movement thereof, and means cooperating with said slideway for guiding the skid during movement thereof, including means engageable with said abutment to limit outward movement of the skid relative to said compartment.

15. In combination, a vehicle having an upright wall, a spare tire compartment opening outwardly through said upright wall, a tire carrying skid movable through said opening to and from said compartment, an abutment adjacent said opening, a support for said skid within said compartment, said support having a slideway extending toward said opening, and means cooperating with said slideway for guiding the skid during movement thereof, including means engageable with said abutment to limit outward movement of the skid relative to said compartment.

16. In combination, a vehicle having a spare tire compartment, a closure therefor, a floor element in said compartment, a tire carrying skid slidable on said floor element into and out of said compartment when said closure is in open position, said skid having a portion adapted to rest upon the ground when the skid is moved out of said compartment, an abutment at the outer end of said compartment, and means cooperating with said floor element for guiding the skid during movement thereof, including means engageable with said abutment to limit outward movement of the skid relative to said compartment.

PAUL J. HUEBSHMAN.

REFERENCES CITED

The following references are of record in the file of this patent:

UNITED STATES PATENTS

| Number | Name | Date |
|---|---|---|
| 2,327,680 | Tavaris | Aug. 24, 1943 |
| 1,947,820 | Alborn | Feb. 20, 1934 |
| 2,155,253 | Biszantz | Apr. 18, 1939 |
| 1,813,094 | Appel | July 7, 1931 |
| 2,063,092 | Groden | Dec. 8, 1936 |
| 2,327,680 | Tavaris | Aug. 24, 1943 |
| 1,603,095 | Palmer | Oct. 12, 1926 |
| 2,370,427 | Sherry | Feb. 27, 1945 |
| 2,169,661 | Ratcliffe | Aug. 15, 1939 |
| 1,761,916 | Hebner | June 3, 1930 |
| 1,761,968 | Bock | June 3, 1930 |

FOREIGN PATENTS

| Number | Country | Date |
|---|---|---|
| 247,682 | British | Feb. 25, 1926 |
| 395,011 | German | May 30, 1923 |
| 348,447 | German | Feb. 9, 1922 |